(12) United States Patent
Donner

(45) Date of Patent: Dec. 21, 2004
(10) Patent No.: US 6,832,696 B2

(54) STRIP MAGAZINE

(75) Inventor: Hans-Christian Donner, Karlsfeld (DE)

(73) Assignee: Hilti Aktiengesellschaft, Schaan (LI)

( * ) Notice: Subject to any disclaimer, the term of this patent is extended or adjusted under 35 U.S.C. 154(b) by 55 days.

(21) Appl. No.: 10/322,826

(22) Filed: Dec. 18, 2002

(65) Prior Publication Data

US 2003/0116458 A1 Jun. 26, 2003

(30) Foreign Application Priority Data

Dec. 20, 2002 (DE) .......................... 101 62 634

(51) Int. Cl.⁷ ................................ B65H 1/00
(52) U.S. Cl. ...................... 221/197; 206/345
(58) Field of Search .................. 221/3, 9, 13, 197; 206/343, 345, 346, 347, 820; 411/443

(56) References Cited

U.S. PATENT DOCUMENTS 4,106,618 A * 8/1978 Haytayan ............... 206/343

* cited by examiner

*Primary Examiner*—Kenneth Noland
(74) *Attorney, Agent, or Firm*—Sidley Austin Brown & Wood, LLP

(57) ABSTRACT

A strip magazine for drive-in elements (2) including a plurality of pairs of retaining webs (3a, 3b), and a respective plurality of pairs of at least partially opposite recesses (6a, 6b) associated with respective pairs of retaining webs (6a, 6b), with the retaining webs (3a, 3b) of each pair of retaining webs (3a, 3b) defining, together with the recesses (6a, 6b) of a respective pair of recesses (6a, 6b), an opening (4) for receiving a stem (5) of a drive-in element (2) and with the recesses (6a, 6b) of the respective pair if the recesses (6a, 6b) extending radially of the respective receiving opening (4) and sidewise limiting the retaining webs (3a, 3b), and with each recesses (6a, 6b) having width at least of a half of that of the retaining web (3a, 3b).

4 Claims, 3 Drawing Sheets

STRIP MAGAZINE

BACKGROUND OF THE INVENTION

1. Field of the Invention

The present invention relates to a strip magazine for use with a drive-in power tool and designed for receiving a plurality of drive-in elements arrangeable in a row along a longitudinal axis thereof in a spaced relationship to each other.

2. Description of the Prior Art

German Utility Models GM-8817271 and GM-9305336 disclose a strip magazine for screws of the type discusses above and having, respectively, four and three retaining webs which are uniformly distributed over a circumference of a bore, in which a screw stem is received, for formlockingly and frictionally retain the stem. The retaining webs are sidewise limited by radially extending four and three incisions, respectively. To provide for the displacement of the screw head through the receiving bore, all of the webs bent downwardly along the stem until a diameter corresponding the diameter of the pushed-through screw head is reached. For limiting the pressing force necessary for pushing the screw head through, the length of an incision is adapted to a radius of the screw head.

With drive-in elements having large head, such as drywall screws with a trumpet-shaped head and fermacell screws with a riffled cone head, often, a rapture of retaining webs extending along the screw magazine takes place. The rapture adversely affects the transportation and storage of a strip magazine, and also can result in jamming of the tool.

Accordingly, an object of the present inventions is to provide a unitary strip magazine for different drive-in elements with differently shaped heads.

Another object of the present invention is to provide a damage-proof strip magazine for drive-in elements.

SUMMARY OF THE INVENTION

These and other objects of the present invention, which will become apparent hereinafter, are achieved by providing a strip magazine having a plurality of pairs of at least partially opposite retaining webs, and a respective plurality of pairs of at least partially opposite recesses associated with respective pairs of retaining webs, with the two retaining webs of each pair of retaining webs defining, together with the two recesses of respective pair of recesses, respective opening for receiving a stem of a drive-in element, with the recesses of the respective pair of the recesses extending at least partially radially of the respective receiving opening and sidewise limiting the retaining web that define, together with the recesses, the respective opening, and with each recess having a circumferential width at least of a half of a circumferential width of a retaining web.

With only small retaining webs, a one-dimensional preload acts on a drive-in element retained therebetween in comparison with a prior art, two-dimensional preload acting on a drive-in element when it is retained between three or more circumferentiallly distributed retaining webs. Therefore, according to the present invention, the press-on force, which acts during mounting, is substantially proportional to the head radius of a drive-in element head, whereas with three or more retaining webs, a square dependence exists between a press-on force and the head radius. As a result, the larger head diameters and specific shapes of the heads of drive-in elements can be accommodated within the limits of a specific press-on force. Therefore, the inventive strip magazine can be used for different, with regard to their head, drive-in elements.

Advantageously, both recesses of a pair of recesses extend transverse to the longitudinal axis of the strip magazine. As a result, there is no retaining web in the magazine region that is stressed as a result of a application of a bending force to the magazine strip. Therefore, the retaining webs are not subjected to any preliminary damage that can lead to a premature rupture during the head of the drive-in element being pressed through the opening defined by respective retaining webs.

Advantageously, at least on of the retaining webs of each pair of retaining webs has a concave surface adjacent to a respective receiving opening and which provides for a stable support of a substantially circular stem that is subjected to pressure applied by the opposite retaining web.

Advantageously, both retaining webs of each pair of retaining webs have concave surfaces adjacent to the receiving opening, which further increases the stability of the drive-in element, as a very small counterpressure is applied.

Advantageously, at least one retaining web of each pair of retaining webs has a bent-out portion in a region of the concave surface and extending along the stem of a drive-in element. This provides for a formlocking and frictional retention of a drive-in element stem.

Advantageously, both retaining webs of each pair are connected with each other about the retaining opening by a small retaining ring, which increases the stiffness of the strip magazine and facilitates the guidance of the drive-in element in the retaining opening. The ring tears when the webs are pressed out downward.

Advantageously, the strip of the magazine is formed as a bendable, deflectable strip, which permits to accommodate a greater number of drive-in elements.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENT

Figure 1:
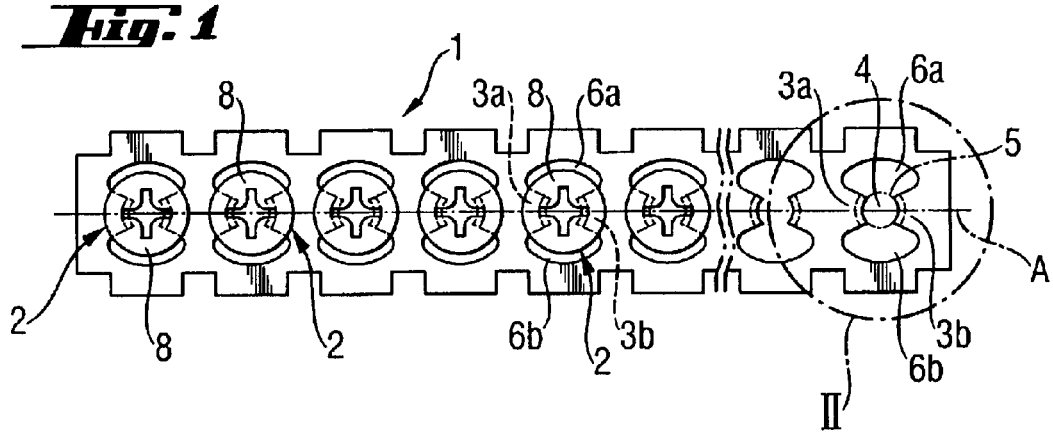
FIG. 1 shows a plan view of a strip magazine according to the present invention with partially inserted drive-in elements.

A strip magazine 1, according to the present-invention, which is shown in FIG. 1 and is used in a drive-in power tool (not shown) is designed for receiving a plurality of drive-in elements 2 arrangeable along a longitudinal axis A of the magazine in a spaced relationship to each other. Each drive-in element 2 is received within two retaining webs 3a, 3b, arranged, at least partially opposite each other and defining, together with recesses 6a, 6b, a retaining opening 4 in which the drive-in element 2 is received. The recesses 6a, 6b are located sidewise of the webs 3a, 3b and have a circumferential width greater than that of the webs 3a, 3b and extend transverse to the longitudinal axis A of the magazine 1.

Figure 2:
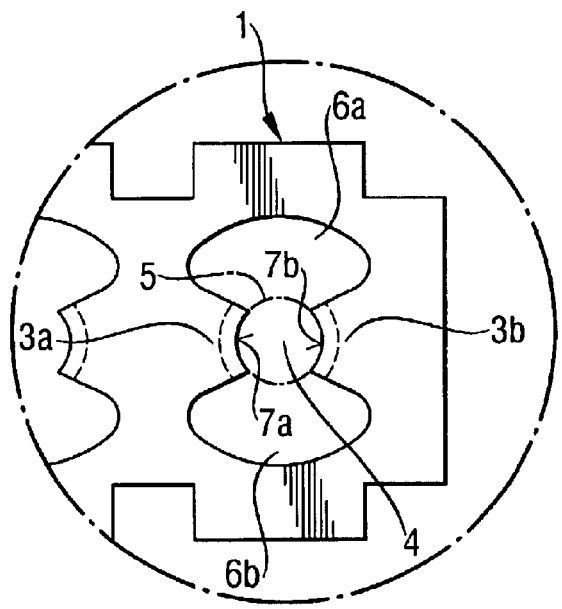
FIG. 2 shows a plan view of a portion II of the strip magazine shown in FIG. 1 at an increased scale.
Figure 2A:
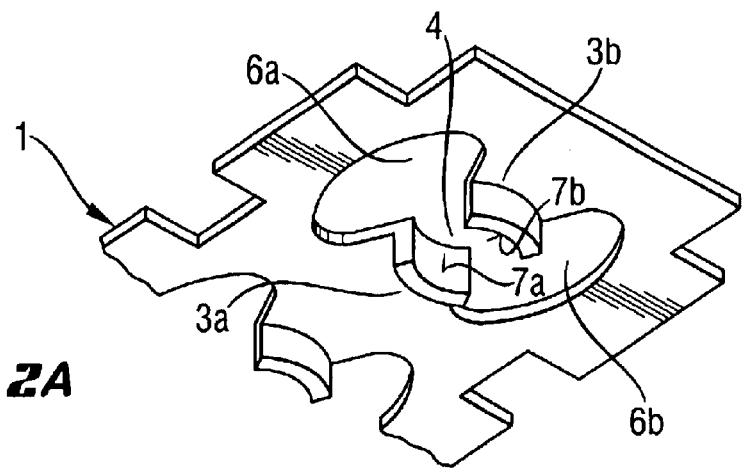
FIG. 2A shows a perspective view of the portion II of the strip magazine shown in FIG. 2.

As shown in FIGS. 2 and 2A, both webs 3a, 3b have, adjacent to the receiving opening 4, concave surfaces 7a, 7b, respectively.

Figure 3:
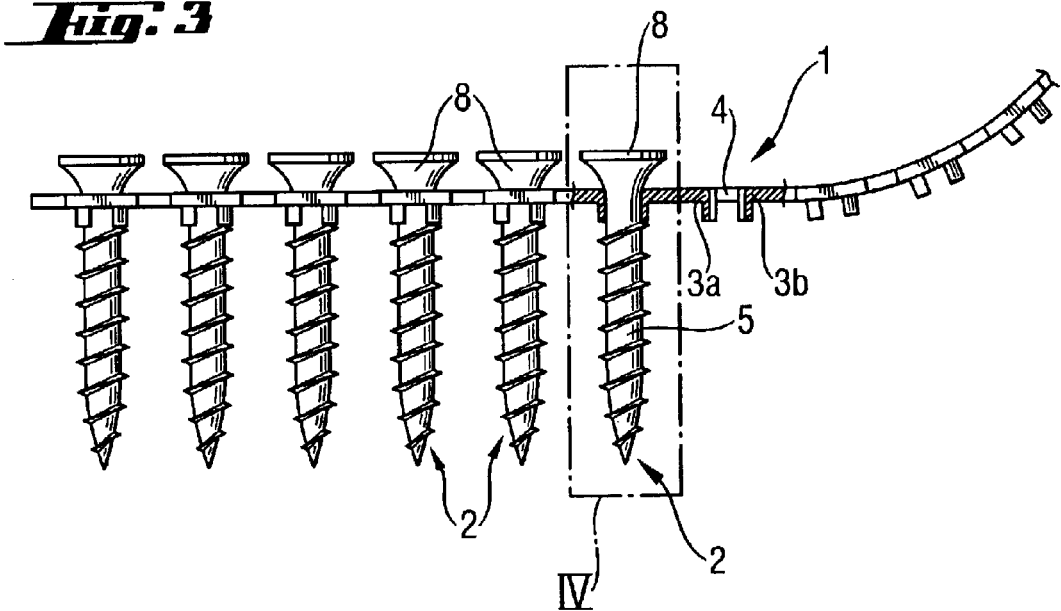
FIG. 3 shows a side, partially cross-sectional view of the strip magazine shown in FIG. 1.

As shown in FIG. 3, the magazine strip 1 is formed as a thin strip bendable in a direction toward the stem 5 of the drive-in element 2.

Figure 4:
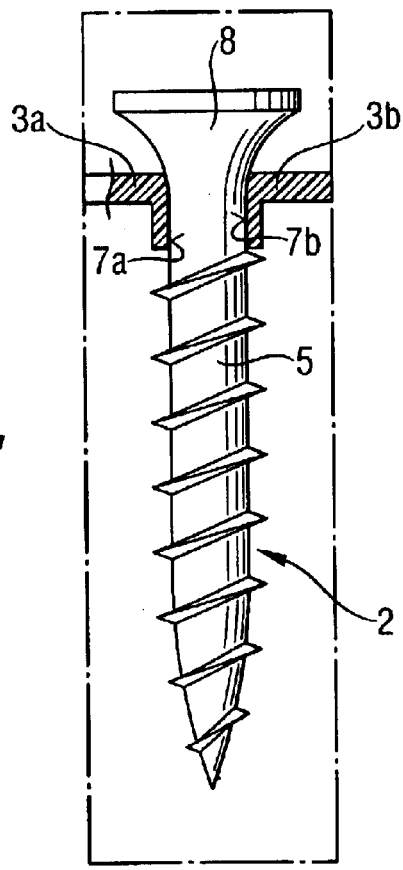
FIG. 4 shows a side view of a section IV of the strip magazine shown in FIG. 3.

As shown FIG. 4, both webs 3a, 3b have, along the stem 5 of the drive-in element 2 bent-out surfaces 7a, 7b within which a section of the stem beneath the drive-in element head 8 is formlocking and frictionally received.

Figure 5:
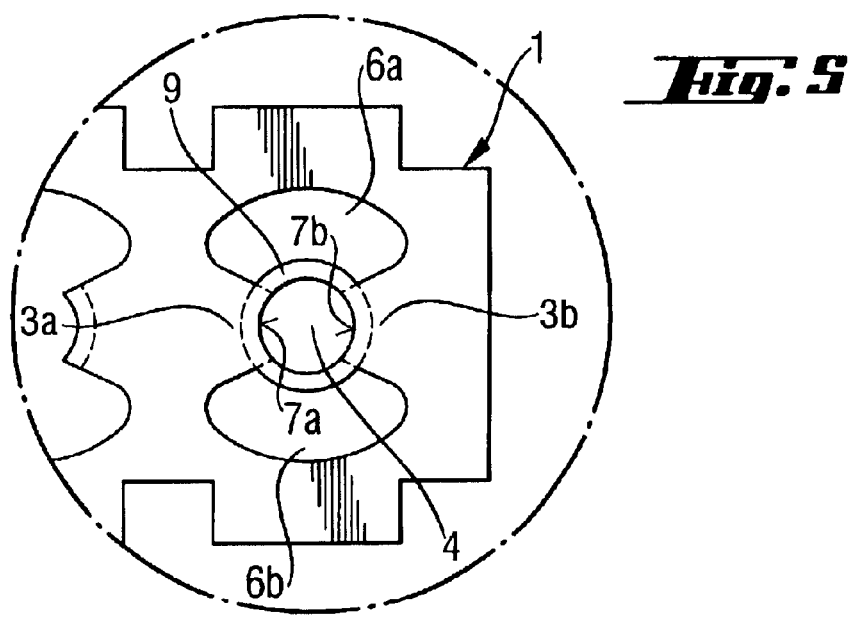
FIG. 5 shows a plan view of a section of another embodiment of a strip magazine according to the present invention, similar to the section II shown in FIG. 2.
Figure 5A:
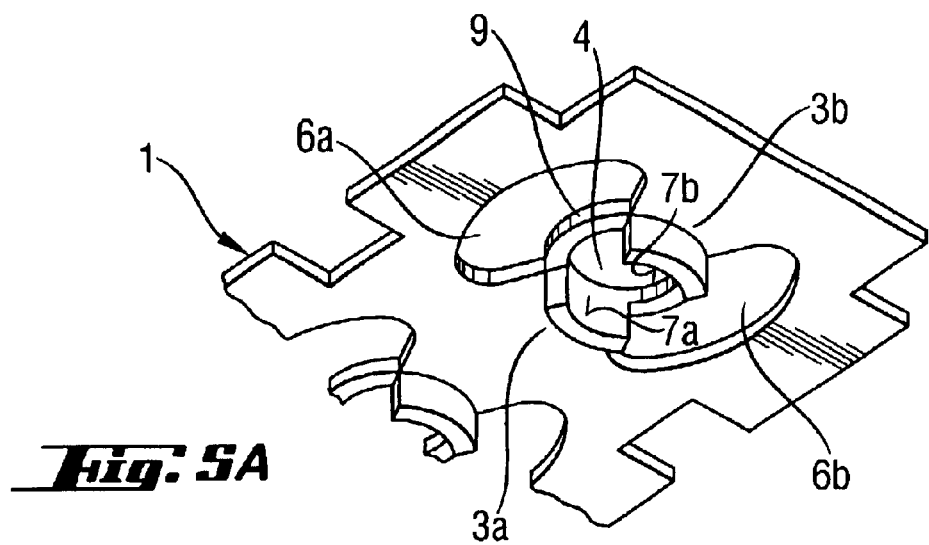
FIG. 5A show a perspective view of the section of the strip magazine shown in FIG. 5.

In the embodiment shown in FIGS. 5–5a, both webs 3a, 3b are connected with each other by a small retaining ring 9.

Though the present invention was shown and described with references to the preferred embodiments such are merely illustrative of the present invention and are not to be construed as a limitation thereof, and various modifications to the present invention will be apparent to those skilled in the art. It is, therefore, not intended that the present invention be limited to the disclosed embodiments or details thereof, and the present invention includes all of variations and/or alternative embodiments within the spirit and scope of the present invention as defined by the appended claims.

What is claimed is:

1. A strip magazine for use with a driving-in power tool and designed for receiving a plurality of drive-in elements (2) arrangeable in a row along a longitudinal axis (A) thereof in a spaced relationship to each other, the strip magazine comprising a plurality of pairs of at least partially opposite retaining webs (3a,3b); and a respective plurality of pairs of at least partially opposite recesses (6a, 6b) associated with respective pairs of at least partially opposite recesses (6a, 6b), the retaining webs (3a,3b) of each pair of retaining webs (3a, 3b) defining, together with the recesses (6a, 6b) of a respective pair of recesses (6a, 6b), an opening (4) for receiving a stem (5) of a drive-in element (2), the recesses (6a, 6b) of the respective pair of the recesses (6a, 6b) extending radially of the receiving opening (4) and sidewise limiting the retaining webs (3a, 3b) which define the receiving opening (4), and each recess (6a, 6b) having a circumferential width at least of a half of a circumferential width of a retaining web (3a, 3b), wherein the magazine strip further comprises a plurality of small retaining rings (9), with each retaining ring (9) connecting the retaining webs (3a, 3b) of each pair of retaining webs (3a, 3b) with each other about the respective receiving opening (4).

2. A strip magazine according to claim 1, wherein the recesses (6a, 6b) extend transverse to the longitudinal axis (A) of the strip magazine.

3. A strip magazine according to claim 1, wherein a magazine strip is formed of a flexural strip capable of being bent-out.

4. A strip magazine for use with a driving-in power tool and designed for receiving a plurality of drive-in elements (2) arrangeable in a row along a longitudinal axis (A) thereof in a spaced relationship to each other, the strip magazine comprising a plurality of pairs of at least partially opposite retaining webs (3a,3b); and a respective plurality of pairs of at least partially opposite recesses (6a, 6b) associated with respective pairs of at least partially opposite recesses (6a, 6b), the retaining webs (3a,3b) of each pair of retaining webs (3a, 3b) defining, together with the recesses (6a, 6b) of a respective pair of recesses (6a, 6b), an opening (4) for receiving a stem (5) of a drive-in element (2), the recesses (6a, 6b) of the respective pair of the recesses (6a, 6b) extending radially of the receiving opening (4) and sidewise limiting the retaining webs (3a, 3b) which define the receiving opening (4), and each recess (6a, 6b) having a circumferential width at least of a half of a circumferential width of a retaining web (3a, 3b), wherein at least one of the retaining webs (3a, 3b) of each pair of retaining webs (3a, b3) has a concave surface (7a, 7b) adjacent to a respective receiving opening (4), wherein both retaining webs (3a, 3b) of each pair of retaining webs (3a, 3b) have concave surfaces (7a, 7b) adjacent to the receiving opening (4), and wherein the retaining webs (3a, 3b) of each pair of retaining webs (3a, 3b) have bent-out portions in a region of the concave surfaces (7a, 7b) and extending along the stem (5) of a drive-in element.

* * * * *